United States Patent [19]

Passarelli

[11] Patent Number: 5,170,366
[45] Date of Patent: *Dec. 8, 1992

[54] APPARATUS FOR MEASURING LOAD BY PROPAGATION OF AN ACOUSTIC WAVE WITHIN A RIGID STRUCTURE

[76] Inventor: Frank Passarelli, 323 S. Church La., Los Angeles, Calif. 90049

[*] Notice: The portion of the term of this patent subsequent to May 14, 2008 has been disclaimed.

[21] Appl. No.: 690,643

[22] Filed: Apr. 24, 1991

Related U.S. Application Data

[63] Continuation-in-part of Ser. No. 428,832, Oct. 30, 1989, Pat. No. 5,016,200.

[51] Int. Cl.⁵ .................. G01G 11/00; G01G 19/08
[52] U.S. Cl. .................................. 364/567; 364/508; 364/569; 73/597
[58] Field of Search ............. 364/567, 508, 506, 569; 73/862.69, 862.62, 862.59, 862.39, 597, 581, 580, 641, 643, 597; 77/210 R, 137, 136

[56] References Cited

U.S. PATENT DOCUMENTS

| | | | |
|---|---|---|---|
| 3,575,050 | 4/1971 | Lynnworth | 73/861.27 |
| 4,073,007 | 2/1978 | Boivin | 364/508 |
| 4,574,634 | 3/1986 | Pappano | 763/597 |
| 4,601,207 | 7/1986 | Steblay | 73/597 |
| 5,004,059 | 4/1991 | Webster | 73/862.59 X |
| 5,016,200 | 5/1991 | Passarelli | 364/567 |

Primary Examiner—Thomas G. Black
Assistant Examiner—Ellis B. Ramirez
Attorney, Agent, or Firm—Jack C. Munro

[57] ABSTRACT

A method and apparatus for determining the magnitude of a load acting on a stucture by measuring the elapsed time an ultrasonic sound wave requires to travel from a transmitting transducer to a receiving transducer, wherein the elapsed time is then interpolated into an estimate of the load. The elapsed time varies according to the magnitude of the load acting on the structure being analyzed. Depending upon application, the load can be a quantity of force, moment, torque, or pressure. The present invention can also be applied to measuring strain. In various embodiments, the present invention may be used in truck axles to determine load; in pressure vessels to determine pressure or fluid level; in aircraft to determine center of gravity and center of lift; in cranes to determine bending moments and imbalanced loading; or in conveyor belts to estimate belt tension.

4 Claims, 11 Drawing Sheets

PIEZOELECTRIC

ELECTRO-MAGNETIC $V_S$ = 12 VOLTS
$V_1$ = +5.0 VOLTS
$V_2$ = +10.0 VOLTS
$V_3$ = −10.0 VOLTS
$V_4$ = ±100 VOLTS
$V_5$ = 3.0 VOLTS

APPARATUS FOR MEASURING LOAD BY PROPAGATION OF AN ACOUSTIC WAVE WITHIN A RIGID STRUCTURE

The present invention is a continuation-in-part of a pending application with U.S. application Ser. No. 07/428,832 by the same inventor, entitled WEIGHT DETERMINING APPARATUS, filed Oct. 30, 1989 to be issued on May 14, 1991 with U.S. Pat. No. 5,016,200.

BACKGROUND OF THE INVENTION

1. Field of the Invention

The present invention relates to a load determining apparatus. More precisely, the present invention relates to an apparatus that uses acoustic or sound waves passed through a structure under load, which load causes a change in the velocity of the acoustic wave that is detected and then converted into an estimate of the magnitude of the applied load.

2. Description of the Prior Art and Related Information

How well a structure endures forces, torques, moments, stresses and strains determines how well it will perform under real life conditions. Hence, it is critical that these loads be closely monitored.

One way of monitoring or measuring load is through strain gage technology. Generally speaking, a strain gage is constructed by embedding a grid pattern of wires or metal foil into a block of resin. The resin block is then cemented to a structure which is to be placed under load and analyzed. Loads such as forces, torques, moments, etc. acting on the structure cause it to distort; and because the resin block is tightly cemented to the structure, distortion takes place therein as well. Distortion of the resin block also bends, stretches or compresses the wires inside. The bending, compressing and stretching change the resistance of the wires, which resistance is easily measured and then converted into a quantity representing stress.

Stress is defined as force acting over an area, so multiplying the measured stress by the affected area results in an estimation of the amount of force. Other loads such as bending moments and torques that equate to a force acting over a bending arm may be similarly estimated.

But strain gages have numerous inherent shortcomings. First, strain gages rely on Hooke's law to determine the amount of elastic strain in a given structure. Hooke's law is expressed as $\sigma = K \cdot \epsilon$, where $\sigma$ represents stress, $\epsilon$ is strain, and $K$ is the Modulus of Elasticity. Importantly, when Hooke's law is applied to strain gages, the relationship between stress and strain is linear over only a small range. Aggravating the non-linearity problem is that strain gages have their own inherent non-linearity so that even when measuring strain within the linear range of the stress-strain curve, many calibration points must be established to ensure accuracy. Of course, once the measured strain exceeds the linear range of the stress-strain curve, the strain gage no longer functions accurately.

Second, the accuracy of strain gage measurements is severely reduced by the tendency of the measured strain to lag with the actual change in stress. Therefore, during periods of increasing actual stress, the measured stress is lower than for the same stress measured during periods of decreasing stress. This phenomenon is somewhat analogous to a hysteresis effect, wherein the measuring instrument, the strain gage here, does not return to zero after unloading.

Third, strain gages tend to yield after being subjected to stress for a period of time. The effect of this yielding is that the measured stress decreases with time. For that reason, strain gage systems require frequent recalibration. Like its counterpart in metals, this phenomenon is sometimes called creep.

Another conventional stress measurement device is a piezoelectric effect load cell. Such a device operates under the piezoelectric effect theory, well-known in the art. Unfortunately, the piezoelectric effect load cell has many of the shortcomings already discussed in connection with the strain gage.

Accordingly, a need presently exists for a device that measures a given load, but does not exhibit the non-linearity, hysteresis and creep problems associated with strain gages or piezoelectric effect load cells. Such a device would improve the accuracy of load measurement in physical structures.

SUMMARY OF THE INVENTION

The present invention relates to a method and device for measuring a given load acting on a structure. To accomplish this objective, the present invention in a preferred embodiment provides that acoustic transducers are mounted to the structure a known distance apart. The transducers are small in size, making installation fast and routine. One transducer emits an acoustic signal and the other receives the signal after it traverses the distance between the two transducers.

If the structure is placed under a load, the time it takes for the sound wave to travel between the two transducers changes as compared to the structure when unloaded. For a structure under tension, the velocity of the sound wave decreases as compared to the reference velocity as measured when the structure was unloaded. Conversely, for a structure under compression, the sound wave velocity increases as compared to the reference velocity. So by testing the structure at various predetermined load levels, and then measuring the differences in velocities which is converted into elapsed times, it is possible to obtain a correlation relating load to time.

According to the present invention, loads that can be measured include forces, bending moments, torques, and pressures. Strain can also be measured following the same calibration techniques disclosed herein.

A microcomputer is used to decode the signal from the receiving transducer. The microcomputer also controls the sequencing for the transmit/receive function, and acquires the resulting time change data and processes it. Once the data acquisition and correlation are complete, the magnitude of an unknown load applied to a structure to be analyzed can be determined simply by measuring its time change.

The measurement of a given load by acoustic techniques effectively eliminates all of the above non-linearity, hysteresis and creep problems, making it possible to build an on-board, real-time stress measurement device capable of accurate measurements over a broad range with high resolution. Other advantages of the present device include the ability to read complex loads (e.g., simultaneous bending and torsional loads).

By comparison, strain gages or piezoelectric load cells are limited to the measurement of load in a one dimensional axis only, and complex loads must therefore be measured using two or more gages oriented in various directions.

Another inherent advantage in using acoustics is that stress of a structure is determined over a relatively long distance. In particular, strain gages are only affected by the conditions immediately surrounding them, which results in the strain gage measuring the load at one point on the structure being analyzed.

In contrast, the present invention uses acoustics to measure a given load over a relatively long distance. Consequently, the advantage of using an acoustic approach over strain gage based designs is that the former allows for much longer gage lengths giving a better, more accurate view of the average load acting on the structure. Fewer transducers are needed, thus simplifying the measurement task.

Furthermore, conventional strain gages fall out of calibration when the material to which they are attached transitions into a plastic mode during tension. By contrast, the present invention acoustic gage continues to function accurately even into the plastic mode all the way to failure of the material. Measuring loads with acoustics as provided by the present invention is thus vastly superior to using strain gages or other conventional stress measuring devices.

In addition, there are numerous applications for the present invention. First, the acoustic transducers provided by the present invention may be mounted to the chassis or axles of a vehicle such as a truck. If the transducers are placed on truck axles, for example, a truck driver can receive continuous, real-time telemetry of forces, torques, and bending moments acting on each axle. Overloading of the truck and unexpected axle breakage are avoided since the truck driver is constantly aware of the conditions in the axles.

Second, the present invention may be mounted on a pressure vessel. The acoustic transducers when incorporated into the pressure vessel or tank wall can detect pressure or stress therein. Wall stress should be closely watched because filling the tank with a fluid or even changes in ambient pressure or temperature could affect the internal pressure of the tank. But when the associated stress induced into the tank walls is measured by acoustic transducers of the present invention and immediately relayed to an operator, a possible tank rupture can be avoided. Moreover, after some data collection that adjust for ambient temperature and other factors, it is possible to determine the level of fluid within the tank merely be reading the magnitude of the load on the tank wall.

Third, the present invention has many uses in aviation. For instance, the acoustic transducers may be implanted into the fuselage or landing gear of an airplane to determine optimal center of gravity or the center of lift for the aircraft when it is loaded with cargo, passengers, etc. By continuously monitoring the readouts from the acoustic transducers, the distribution of weight from the cargo or passengers can be repositioned to obtain the proper center of gravity for the airplane before it lifts-off. In this application, the present invention provides that an array or rosette pattern of acoustic transducers be mounted to strategic parts of the aircraft.

Fourth, the acoustic transducers of the present invention can be used in the construction and maritime industries with specific application to cranes. An array of acoustic transducers can be attached to critical joints to determine the specific loads exerted thereon. With this data, maintenance crews can repair or replace overstressed and damaged parts before they fail altogether. The same transducer setup can provide data to determine if the crane is improperly loaded creating a dangerous imbalanced condition. From the foregoing, it is clear that the addition of the present invention to cranes significantly improves their safety.

Fifth, the present invention can be adapted for use on conveyor belts commonly found in production facilities or warehouses. In this application, the transducers are attached to the frame of the conveyor. The tension from the static and dynamic loading of the conveyor belt passes to the frame and is detected by the transducers as before. Hence, the tension in the belt can be measured.

Therefore, it is an object of the present invention to provide a device that measures loads acting on a structure by determining the change in elapsed time of an acoustic signal passing between two points on the structure. It is another object of the present invention to provide a load measurement device that is not plagued with problems of non-linearity, hysteresis, or creep. It is yet another object of the present invention to provide a load measurement device that can be incorporated into vehicle axles, pressure vessels, aircraft, cranes, and conveyor belts.

DETAILED DESCRIPTION OF THE INVENTION

Figure 19:
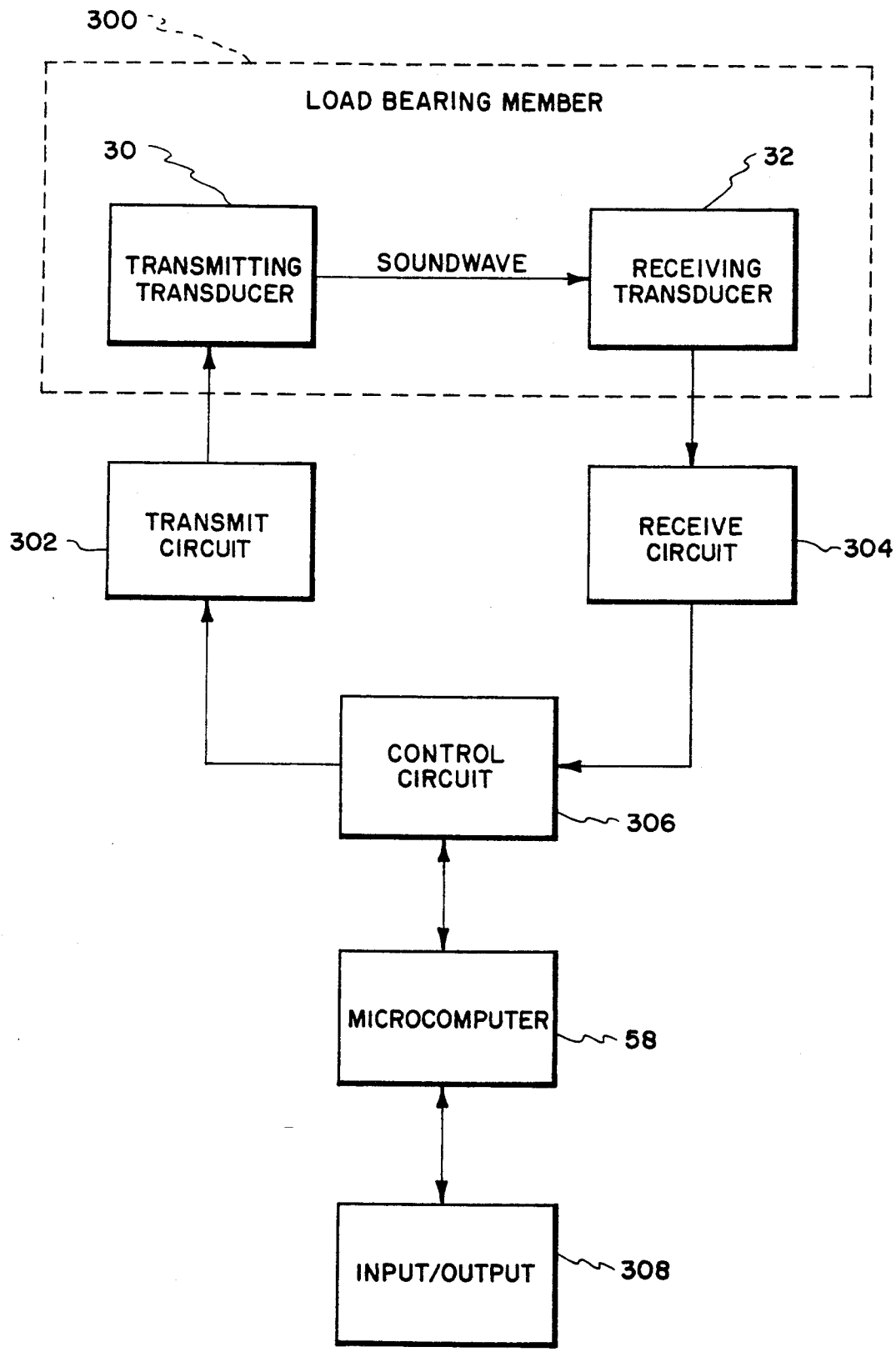
FIG. 19 provides a block diagram of a preferred embodiment of the present invention.

The present invention is directed to an apparatus and a method for determining the magnitude of loads acting on a structure by measuring the change in time of an acoustic wave traveling from one point on the structure to another in which the measured change is proportional to the magnitude of the load applied. In a preferred embodiment shown in FIG. 19, the present invention comprises an acoustic transmitting transducer 30, an acoustic receiving transducer 32, corresponding transmit 302 and receive circuits 304, a control circuit 306 and a microcomputer 58 to coordinate and control signal flow, and an input/output device 308 for interfacing with a user.

Briefly stated, the present invention operates as follows. The transducers 30 and 32 must first be firmly attached to the load-bearing member 300. Next, the user via the microcomputer 58 causes the control circuit 306 to emit a signal through the transmit circuit 302, which is connected with the transmitting transducer 30. The transmitting transducer 30 converts the electrical impulse into a sound wave, which propagates away from the transmitting transducer 30 source.

The waveform of the sound wave is actually made up of a short burst of about 1000 individual pulses. These pulses should preferably be in the ultrasonic frequency range (i.e., around 500 kHz or above).

At a known distance away from the transmitting transducer 30 is the receiving transducer 32, which detects the sound wave, converts it back into an electrical impulse, and returns the impulse to the control circuit 306. In the interim, the microcomputer 58 measures the elapsed time from when the signal was emitted by the transmitting transducer 30 to the time the sound wave is received.

This procedure is repeated with various known loads applied to the load-bearing member 300. Afterward, a correlation between the changes in elapsed time and their respective loads is formulated. Once the correlation is established, the magnitude of any unknown load can be interpolated or extrapolated from the correlation by simply measuring the time change caused by the load.

The load measured by the present invention may be a quantity of force, moment, torque, or pressure; strain can also be determined by the above-mentioned procedure. This is in contrast to the parent application which describes and claims an apparatus and method for measuring structural loads in terms of weight.

In classical mechanics, quantities such as force, torques, bending moments, weights, etc. are all related; i.e., being able to measure one quantity allows conversion into another quantity. For example, weight is expressed as follows:

$$W = m \cdot g$$

where
$W$ = weight
$m$ = mass
$g$ = acceleration due to gravity.

If the expression is applied in the context of a truck mounted weighing system, axle stresses can be determined relative to the changing vehicle mass in the presence of constant acceleration due to gravity. That is, once a correlation between weight and time delay is established according to the discussion outlined above, any unknown weight can be determined by measuring the time delay caused thereby and interpolating a weight value based on the correlation. Once the weight is calculated, the mass of the load in the truck can be computed by dividing out the acceleration due to gravity constant (i.e., 32.17 ft/sec$^2$).

In the case of measuring other forces acting upon a vehicle once the resting mass has been ascertained by satisfying the preceding procedure, it is possible to estimate the acceleration or decelerating (braking) forces acting upon the vehicle's axles.

Figure 18A:
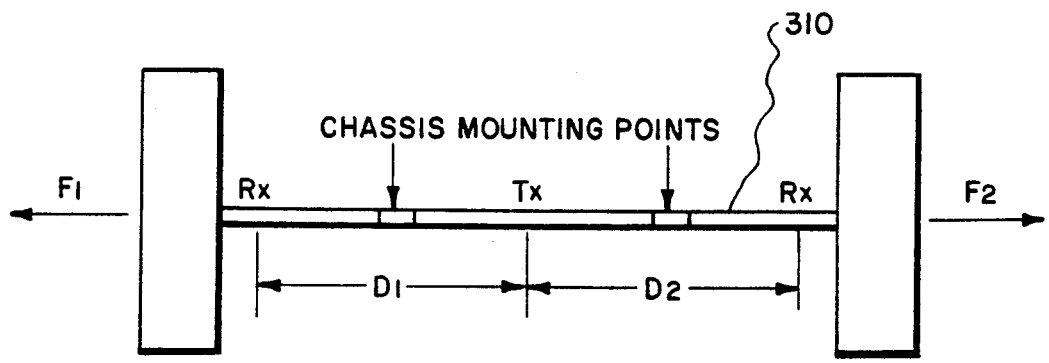
FIG. 18(a) is a front view of a truck axle upon which are mounted transducers provided by the present invention.
Figure 18B:
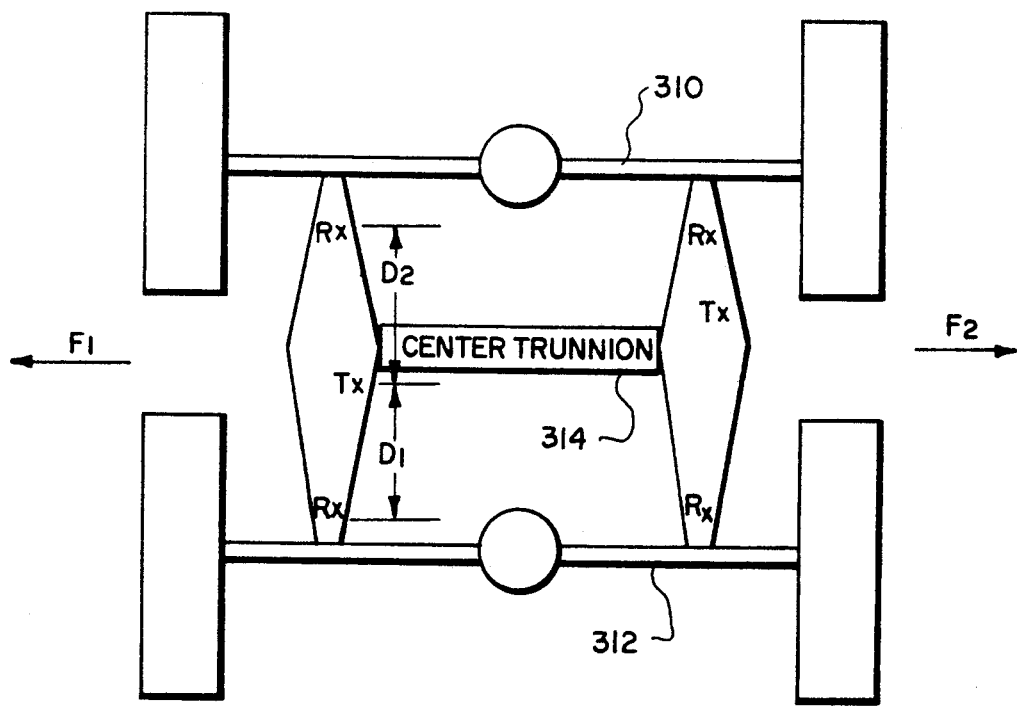
FIG. 18(b) is a plan view of the truck axle shown in FIG. 18(a).

For instance, FIGS. 18(a) and (b) depict vehicle axles 310 and 312 with acoustic transducers Tx (transmitting) and Rx (receiving) mounted thereon. Regardless of arrangement, it is important to note the distance between the transmitting transducer and the receiving transducer, labeled as $D_1$ and $D_2$. The three transducer array shown in FIG. 18(a) mounted on the front axle 310 provides the user with the ability to monitor individual static wheel loads as well as lateral acceleration. Given that at any instant the vehicle mass is constant, a change in the measured load or stress upon that segment is due to a change in the acceleration normal to the direction of travel. The same applies to the rear axle 312, shown in a plan view in FIG. 18(b). Due to the design of this particular class of axles, it is not only possible to ascertain the individual front 310 and rear axle 312 weights by the closely spaced transducer pairs Tx and Rx mounted on either side of the center trunnion 314, but by mounting another receive transducer Rx as part of a linear array, it is also possible to monitor the lateral acceleration of the vehicle. This data can be incorporated into vehicle control systems for purposes such as active suspension control and brake modulation systems.

In addition, if lateral acceleration is known, lateral forces or inertial forces from the mass of the vehicles $F_1$ and $F_2$ can be approximated. Thus the present invention has utility in vehicle performance testing, for example.

Figure 1:
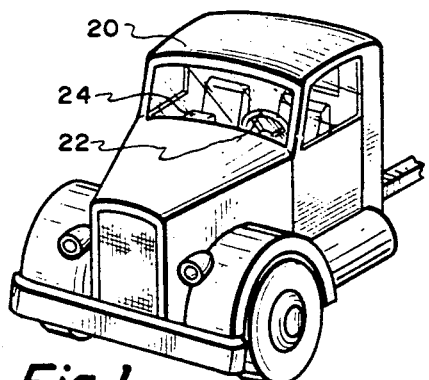
FIG. 1 is an isometric view of the cab portion of a typical truck in which the present invention may be used.
Figures 2, 3, 4:
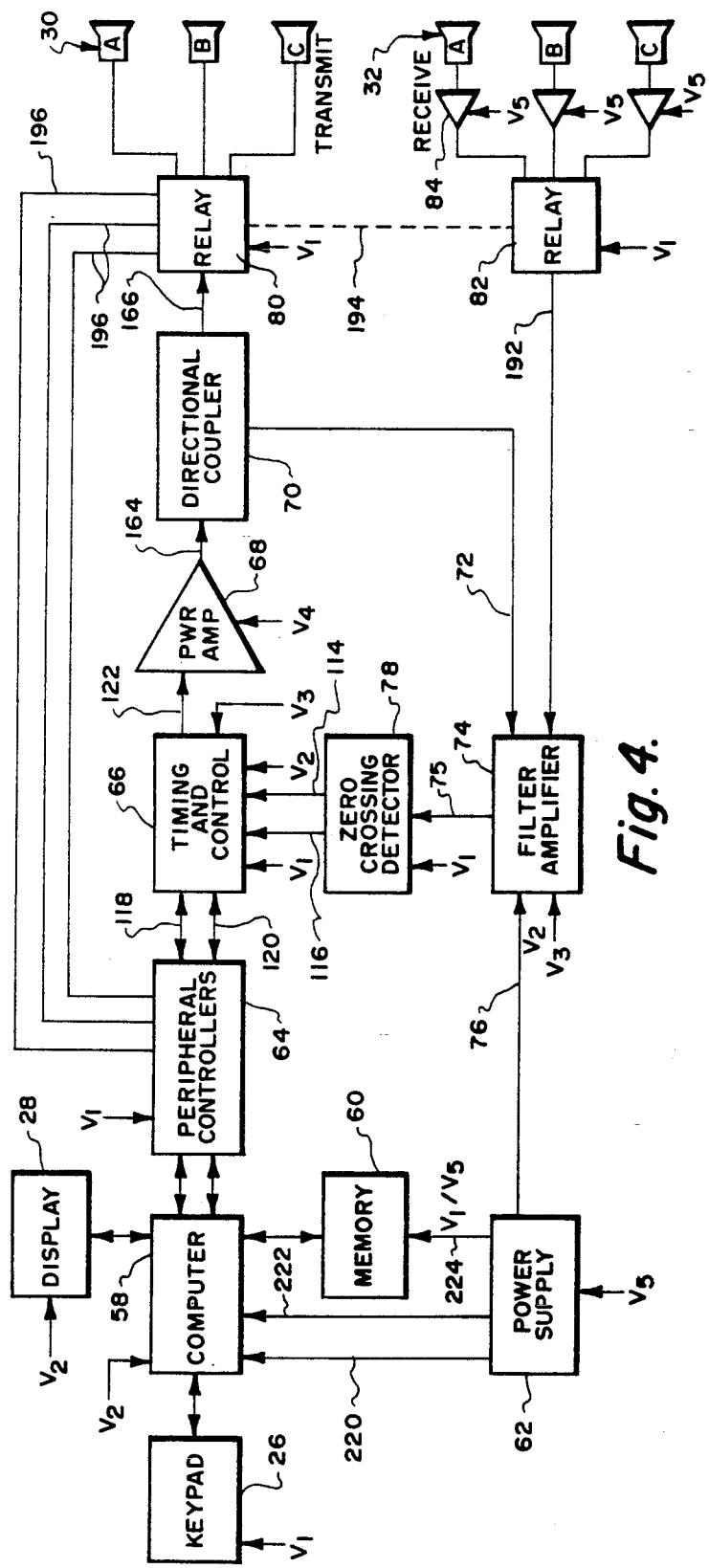
FIG. 2 is a truck axle on which acoustic transducers provided by the present invention have been mounted.
FIG. 3 is a load-bearing member of a truck upon which transducers provided by the present invention have been mounted.
FIG. 4 is a block diagram of an embodiment of the present invention.

FIGS. 1–11 illustrate the hardware necessary for the above-mentioned truck axle embodiment of the present invention. Referring particularly to FIG. 1, there is shown the cab 20 of a conventional truck. Cab 20 includes a driver's compartment within which is located a steering wheel 22 and a dashboard (not shown). The console 24 is generally depicted as being mounted on the dashboard. That console is to contain a series of manually operated buttons as well as some form of a display which in all probability would be a digital display composed of light emitting diodes which will display a numerical value which would be weight that is being measured. Referring particularly to FIG. 4, of the drawings, the buttons that would be operated by the operator of the truck would be located on keypad 26. The digital display is generally shown as block 28 in FIG. 4. Many of the electronic components depicted in block diagram in FIG. 4 may be included within the console 24. However, such inclusion is not mandatory and may be mounted in other areas of the cab 20 or even in areas of the truck that are not shown in FIG. 1.

The weight determining apparatus of this invention includes a series of transmitting transducers 30 and a series of receiving transducers 32. These transducers 30 and 32 are acoustical; that is, the transmitting transducers 30 produce a sound wave and the receiving transducers 32 pick up that sound wave. These transducers 30 and 32 can be constructed in any manner that is deemed to be desirable. It has been found that it is possible to use either a piezoelectric transducer or an electromagnetic transducer.

Figure 8:
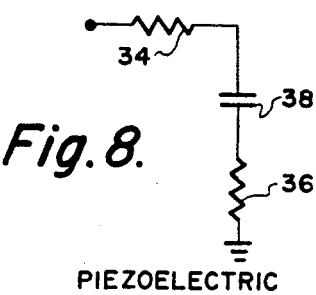
FIG. 8 is an electrical schematic of a piezoelectric transducer shown in block form in FIG. 4.
Figure 9:
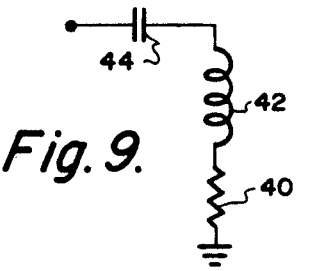
FIG. 9 is an electrical schematic of an electromagnetic transducer shown in block form in FIG. 4.

The basic equivalent electrical circuit for piezoelectric transducer is shown in FIG. 8 basically this circuit load appears to the power amplifier as a pair of resistors 34 and 36 which are electrically mounted in series with a capacitor 38. The equivalent circuit for the electromagnetic type of transducer is depicted within FIG. 9 which is comprised of a series arrangement of a resistor 40, an inductor 42 and a capacitor 44. Both the piezoelectric and the electromagnetic transducer function to produce a physical vibration on or in a structure. It is that vibration that is the acoustical wave. Generally the structures utilized are metallic and comprise a load bearing member of the structure that is to be weighed. In the case of a truck, a typical load bearing member would be an axle which is mounted between a pair of wheels of a truck. A typical truck may have anywhere from two to twenty or more axles. On each axle is to be mounted a transmitting transducer 30 and a receiving transducer 32. These transducers 30 and 32 are mounted in a spaced apart arrangement with this spacing being known and preselected.

Referring particularly to FIGS. 2 and 3 of the drawings, there is schematically shown two different types of typical load bearing members, or axles, for trucks. Within FIG. 2 there is shown an axle 46 which is to have mounted at opposite ends thereof wheels through which the reaction force $F_2$ is transmitted. Main load force $F_1$ is subjected to the axle 46 at its approximate point. A transmitting transducer 30 and a receiving transmitter 32 is to be fixedly mounted onto the axle 46 in the approximate manner that is shown.

It is noted that the transducers 30 and 32 are mounted on one continuous span of the axle 46, in other words, between load $F_1$ and a wheel reaction force $F_2$. It would normally not be desirable to mount transducers 30 and 32 in a manner to be located therebetween. As force $F_1$ increases and bending of the axle 46 increases, the stress within axle 46 is increased. In terms of the molecular structure of the metallic material of the axle 46, the molecules of the axle 46 somewhat tightly pack together. It has been found that for most metallic materials that if one were to chart an elapsed time versus weight curve, that such would be substantially linear although linearity is not necessary for the present invention. Any curve representation can be dealt with satisfactorily.

What is meant by linear is if there is no load within the truck, only the weight of the truck itself and that portion of the truck weight that is transmitted through axle 46 is represented by $F_1$. $F_2$ will equal one-half of $F_1$. At this particular weight, an acoustic wave will be transmitted through transmitting transducer 30 and the elapsed time of this transmission is noted when such is picked up by receiving transducer 32. Now, increase $F_1$ a known weight such as five thousand pounds. Another acoustic wave will be transmitted from transducer 30 and picked up by transducer 32 and that elapsed time accurately measured. The same procedure is repeated for ten thousand pounds, fifteen thousand pounds, twenty thousand pounds, etc. In a graphical representation where weight would be the X-axis and elapsed time would be the Y-axis, it would be discovered that the resultingly formed graph would be in essence a straight line.

It is to be understood that in actual practice, the transducers 30 and 32 will be tightly fixedly mounted to the axle 46. In all probability the transducers 30 and 32 will be tightly clamped in position in some manner on the axle 46 and may also include some form of an adhesive. However, the exact transducer clamping arrangement for the axle 46 is not specifically described since numerous different types of transducer fixing means could be utilized without departing from the scope of this invention. If a piezoelectric transducer is utilized, it must be in intimate contact with the axle. The operating portion of the electromagnetic transducer may be slightly spaced from the axle.

As shown in FIG. 4, there are three in number of the transmitting transducers 30 and three in number of the receiving transducers 32. In actual practice, there may be utilized a substantially increased number of transducers with it to be understood that there is a transmitting transducer 30 and a receiving transducer 32 for each axle 46. A typical truck may have seven axles. There may be utilized a pair of such transducers 30 and 32 on each axle and by the operator pushing appropriate buttons on the keypad 26, a weight value for a selected axle will be displayed in the display 28. This procedure is to be repeated for each axle. However, it is considered to be within the scope of this invention that the user may not place a pair of transducers on each and every axle as it only may be necessary to determine the weight of one axle or even only two or three of the axles.

Referring particularly to FIG. 2, there is shown a different type of axle 48. This axle 48 is connected again between wheels 50 and 52. The wheels 50 and 52 combine to produce the reaction force which is called $F_2$. Mounted on the upper surface of the axle 48 are a pair of beams 54 and 56 located in a spaced apart manner. The load $F_1$ will normally be equally distributed between the beams 54 and 56. The transmitting transducer 30 and the receiving transducer 32 are to be fixedly mounted onto the axle 48 between the beams 54 and 56. Again, the spacing between the transducers 30 and 32 is known.

It is to be understood that the apparatus of this invention could be utilized in conjunction with other configurations of axles other than axles 48 and 46 without departing from the scope of this invention.

The basic operation of this invention is generally depicted within FIG. 4. The human operator initiates a measurement sequence through the keypad 26. This measurement sequence is supplied by a computer 58. The computer 58 has been initially preprogrammed through memory 60 with the elapsed time versus weight for the specific axle of the truck that is to be measured. It is to be understood that although most trucks have the same type of axles, it is possible that there may be utilized two or three different types of axles within the same truck. In other words, a given truck may have an axle 46 and also an axle 48. The computer is to be supplied appropriate data for each axle and when that particular axle is activated, only the data that is pertinent to that axle is to be called upon within the computer 58.

Power to both the computer 58 and the memory 60 is supplied by power supply 62. The power supply 62 is supplied input power which is denoted as Vs from a source which is a conventional twelve volt battery which is a common voltage for batteries within motor vehicles. However, it is considered to be within the scope of this invention that any input source of power could be utilized and even if the input source is different than twelve volts, the appropriate electrical components of the apparatus of the present invention could be modified accordingly.

The computer 58 transmits a signal through peripheral controllers 64 to a timing and control circuit 66. Within the timing and control circuit 66, there is generated a pulse which is amplified by power amplifier 68 and supplied into a directional coupler 70. A portion of this signal is fed back through a conductor 72 to a filter amplifier 74. Part of the power being supplied to filter amplifier 74 is transmitted from power supply 62 through conductor 76. This feedback signal from the filter amplifier 74 is transmitted through conductor 75 into a zero crossing sector 78 and back into the timing and control circuit 66.

The main signal from the directional coupler 70 is transmitted to a relay 80. The relay 80 activates one of the transmitting transducers 30. At the same time, the relay 80 is coupled to relay 82. Relay 82 receives the signal from the receiving transducers 32. When relay 80 is coupled to transmitting transducer A, at the same time relay 82 is coupled to transducer A of the receiving transducer 32. This insures that only a single pair of the transducers are activated at a given time and only that pair that are mounted on an axle.

The acoustic wave is now propagated through the axle with the timing being initiated by the timing and control circuit 66. This signal, when picked up by the receiving transducer A is amplified by amplifier 84 prior to being supplied to the relay 82 and then into filter amplifier 74. From the filter amplifier 74 the signal is transmitted through the zero crossing detector 78 and into the timing and control circuit 66. The elapsed time between the transmitting and receiving of the signals is determined and transmitted into the computer 58 where it is interpolated. This interpolated weight value is then displayed numerically by the display 28.

The computer 58 is conventionally available and could be any one of a variety of eight or sixteen bit designs. A desirable unit is model "Wildcard 88" that is manufactured by Intel Corporation in Santa Clara, Calif. This model of computer is complete with the exception of a display, a keyboard and a random access memory. Seen in FIG. 4, the computer 58 has connected thereto a keypad 26, display 28 and memory 60. Also, to be associated with the computer 58 is interface circuitry in the form of peripheral controllers 64. The peripheral controllers 64 is actually composed of three identical units with Model No. 8255A, which is also manufactured by Intel Corporation, has been found to be most satisfactory. The general purpose of the peripheral controllers 64 is to interface peripheral equipment to the computer 58. The configuration of Model No. 8255A of Intel Corporation is programmed by software so that normally no external logic is necessary to interface peripheral devices. The peripheral controllers shown as a block diagram in FIG. 4 actually comprises three in number of separate units, which as previously mentioned are identical. These three separate units are shown as IC6 in FIG. 11, and IC7 and IC10 in FIG. 5.

Figure 5:
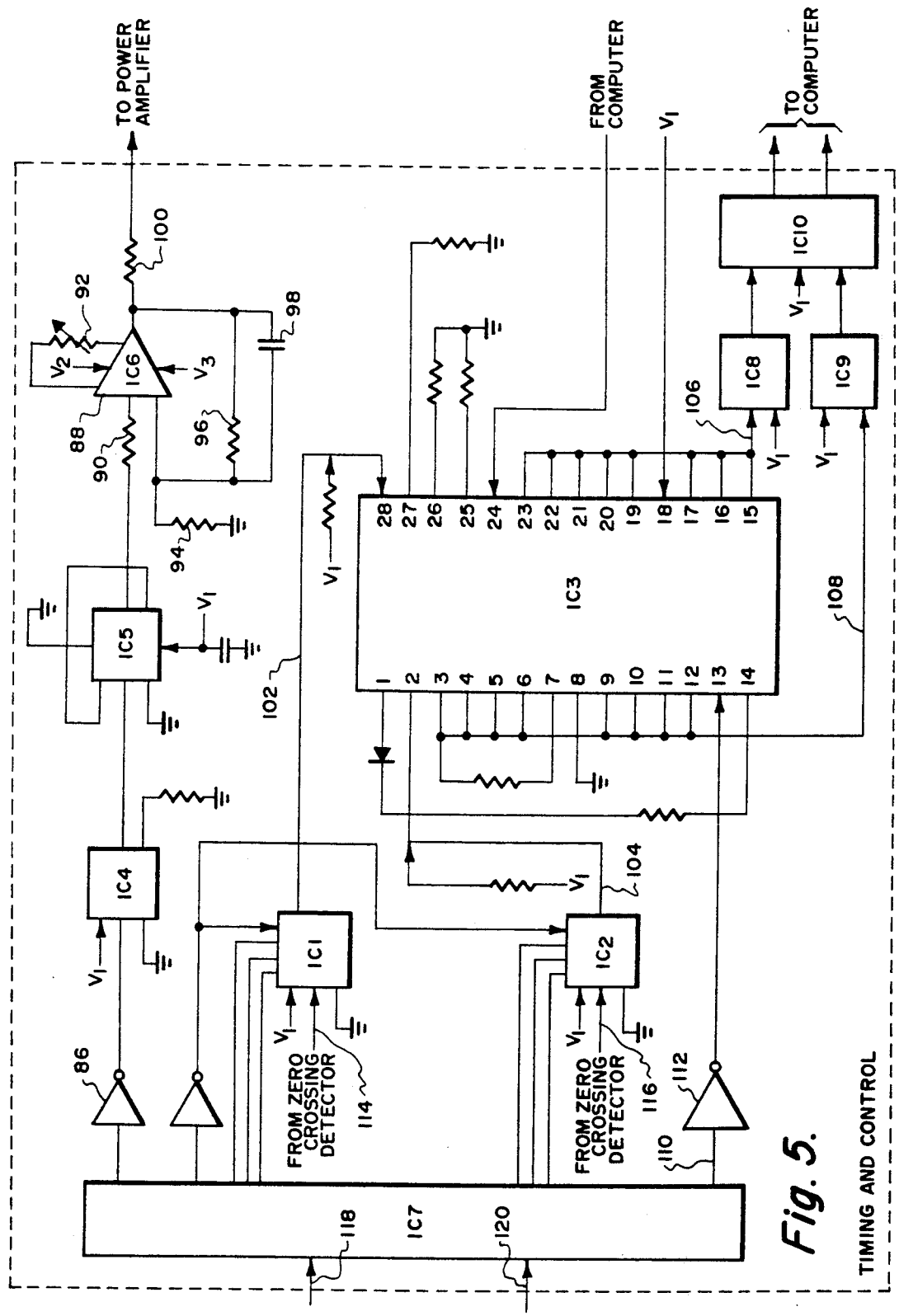
FIG. 5 is an electronic schematic diagram of a timing and control circuit shown in block form in FIG. 4.

The timing and control circuit 66 is shown more specifically in FIG. 5. This circuit provides two major functions which are (1) the excitation signal for the power amplifier and the transmit transducers 30 and (2) the time interval measurement of the received signal from the receive transducers 32. The computer 58 provides for timing, control and data acquisition functions through IC7 and IC10.

Within the timing and control circuit, the excitator signal is initiated at IC7, through inverter 86 to a gated oscillator IC4. The function of the inverter 86 is to change the signal to the right polarity. A satisfactory type of inverter is a hex inverter, Model No. 54S/74S04, manufactured by National Semiconductor Corporation of Santa Clara, Calif.

The gated oscillator IC4 provides a square wave burst of programmable length and fixed frequency determined by a signal applied to IC4. IC4 is coupled to a divide circuit shown by IC5. The ICS is part number 54S/74S74, again manufactured by National Semiconductor Corporation, defined as a dual D-type positive edge-triggered flip-flop. This flip-flop provides a proper frequency to power amplifier 68 and the transducers 30. The output of ICS is coupled by way of resistor 90 to amplifier 88. A desirable model of amplifier 88 is what is manufactured by Radio Corporation of America, part number CA3100, entitled Wide Band Operational Amplifier. Amplifier 88 provides both level shifting, by means of potentiometer 92, and gain by means of feedback network composed of resistors 94 and 96 and capacitor 98. The output of amplifier 88 is coupled to power amplifier 68 by way of resistor 100.

The function of IC5 is to lower the frequency of the output of IC4. IC5 and IC4 are to both be supplied input voltage of $V_1$.

The elapsed time, or the time interval measurement between the transmit and receive signals of the transducers 30 and 32, is calculated by a circuit represented by IC1, IC2 and IC3 of FIG. 5. IC1 and IC2 act as programmable pulse discriminators controlled by IC7. The single cycle of the pulses received from the transmitting and receiving transducers 30 and 32 are selected and conditioned for transmission to IC2 and IC3. A typical model for IC3 would be an 8-Digit Multifunction Frequency Counter/Timer, part number ICM7216B, manufactured by General Electric Intersil Corporation of Cupertino, Calif. IC3 is configured for a high resolution time interval measurement. External oscillator input is derived from the internal oscillator of the computer 58. The transmit signal is supplied through conductor 102. The received transducer signal is supplied through conductor 104. Counter reset control is provided by IC7 to clear the counter after a measurement cycle has been completed.

IC3 automatically performs the time interval measurements and presents its output data multiplexed to two eight bit busses through data lines 106 and 108. Data line 106 connects to IC8 and data line 108 connects to IC9. IC8 and IC9 are identical and are defined as Octal Buffer/Line Drivers, Model No. 74S241, by National Semiconductor Corporation. IC8 and IC9 are both supplied voltage $V_1$. IC8 and IC9 convert the signals to a desired level that is compatible to IC10. The outputs of IC8 and IC9 are supplied to IC10. Referring particularly to FIG. 5, the reset pulse of IC7 is transmitted through conductor 110 and through inverter 112 to pin number 13 of IC3. Conductor 114 from the zero crossing detector 78 connects to IC1. Conductor 116 from zero crossing detector 78 connects to IC2. Conductors 118 and 120 connect the peripheral controllers to the timing and control circuitry 66. The timing and control circuitry 66 is to produce a low distortion square wave with a maximum amount of energy per pulse.

Figure 7:
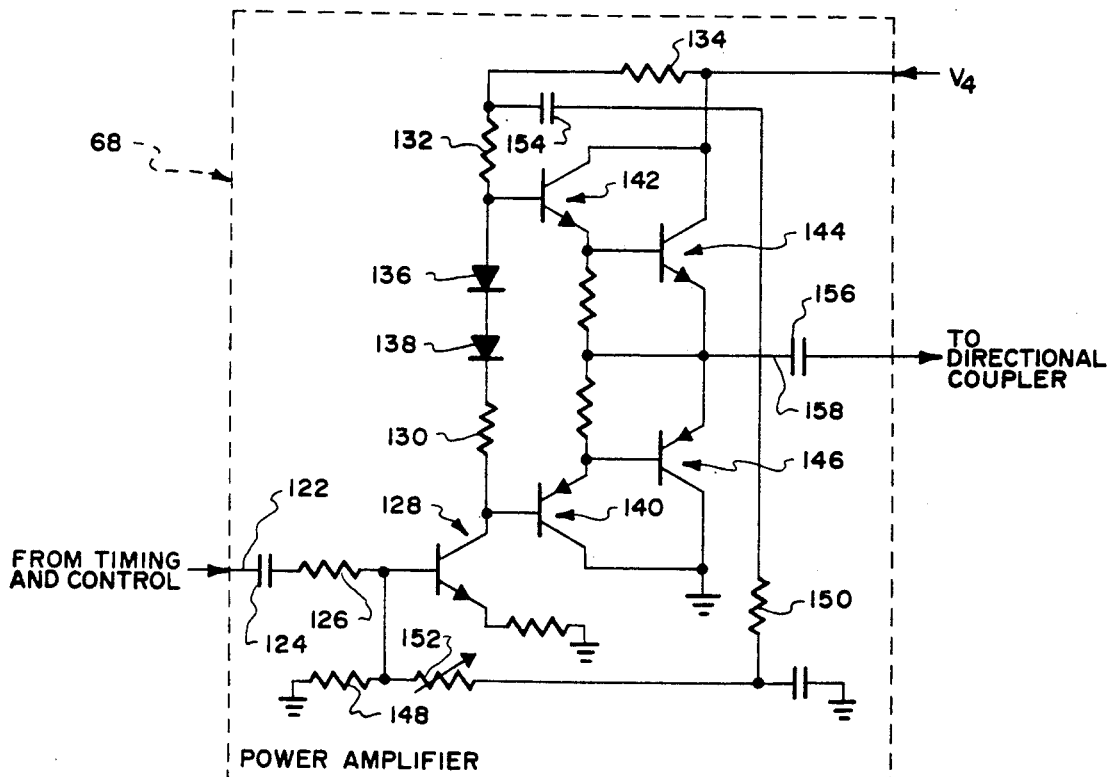
FIG. 7 is an electronic schematic diagram of a power amplifier shown in block form in FIG. 4.

Referring particularly to FIG. 7, there is shown the circuit for the power amplifier 68. The circuit for the power amplifier 68 has the function of driving the transmitting transducer 30. The power amplifier circuit 68 can take on a variety of configurations but a typical implementation of a complimentary symmetry power amplifier is adequate to drive the low impedance loads of the acoustic transducers 30. The input from the timing and control circuit 66 through conductor 122 is coupled by way of capacitor 124 and resistor 126 to the base of the drive transistor 128. A General Electric Corporation, D44H transistor would be satisfactory. Resistor 130, 132 and 134 are coupled with diodes 136 and 138 to provide the bypass currents and voltages required for transistor 128 as well as transistors 140, 142, 144 and 146. The diodes 136 and 138 provide the stability for the output of transistors 140, 142, 144 and 146. The voltage mode feedback path is provided through resistors 148, 150 and variable resistor 152. Additional feedback is provided to increase the overall gain of transistor 128 by capacitor 154. The output transistors 140, 142, 144 and 146 could each be the same such as Model No. D44E of General Electric Corporation. The transistors 140, 142, 144 and 146 are capacitively coupled by capacitor 156 through output line 158 to directional coupler 70 and hence to relay 80.

Figure 6:
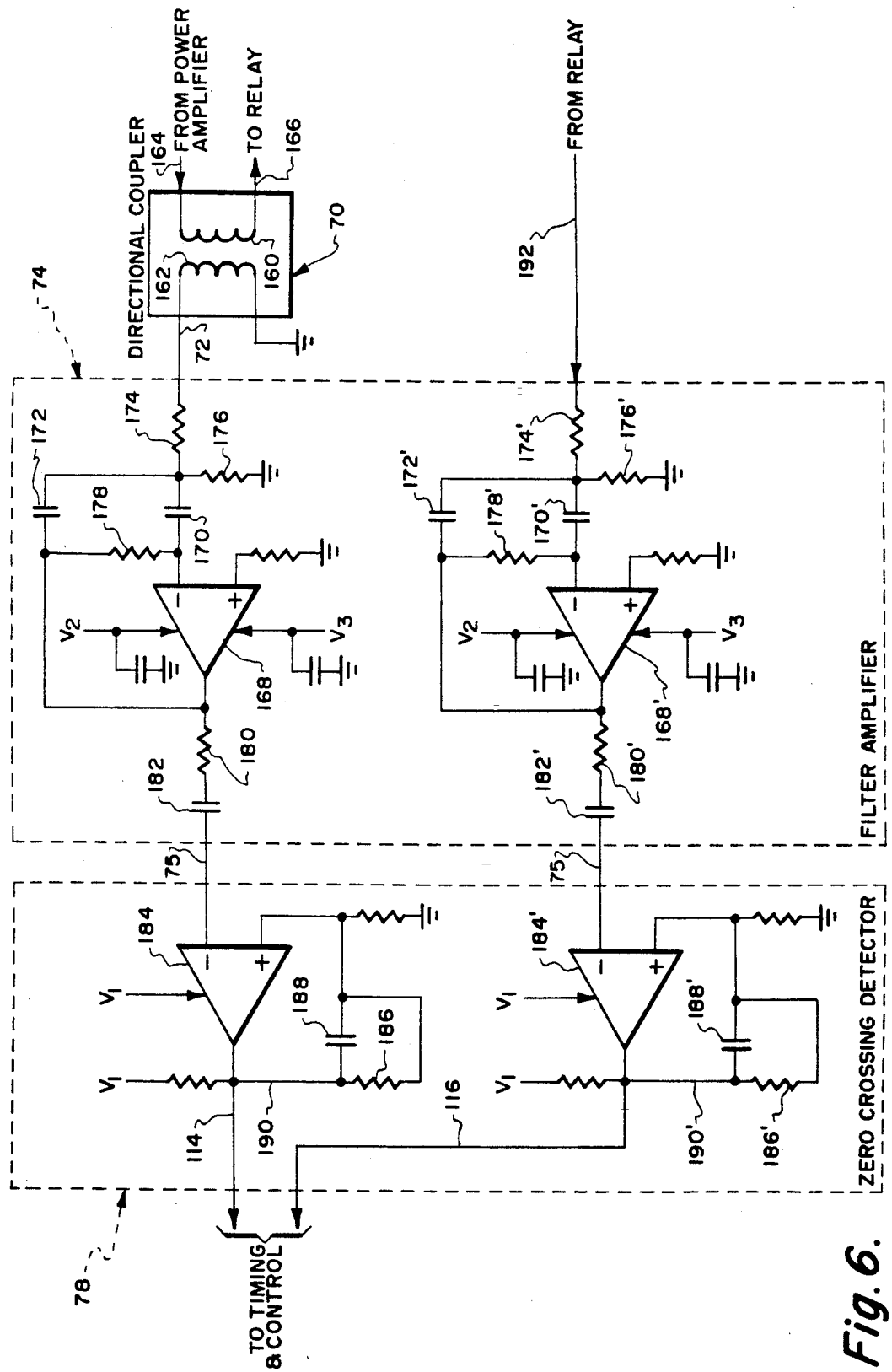
FIG. 6 is an electronic schematic diagram of a zero crossing detector circuit and a filter amplifier shown in block form in FIG. 4.

FIG. 6 depicts a typical example of a circuit for the filter amplifier 74 and the zero crossing detector 78. The purpose of the filter amplifier 74 and the zero crossing detector 78 is to convert a sample of the transmitted pulse that is being transmitted to the transducers 30 and the signal that is received by the transducers 32 from an analog signal to a digital signal which is then measured for a time interval between the transmit and the receive signals. The diverted transmitted signal starts the timing process. The received signal stops the timing process. The time interval therebetween is calculated.

The circuitry shown in FIG. 6 obtains the diverted signal from the directional coupler 70. This directional coupler 70 includes a main coil 160 and a diverted coil 162. The main signal is transmitted from the power amplifier 68 through conductor 164. The main signal from the directional coupler 70 is transmitted through conductor 166 to relay 80. The coil 162 picks up a low level sample from the transmitted signal which is then conducted through conductor 72 to the inverting input of amplifier 168 which is acting as an active band-pass filter. Associated with the amplifier 168 is a feedback network comprised of capacitors 170 and 172 and resistors 174, 176 and 178 providing band-pass filtering with signal gain in the desired passband. The output of this feedback network is then conducted through resistor 180 and is AC-coupled through capacitor 182 to the inverting input of a differential comparator 184. The comparator 184 detects the zero-crossing points of the input pulse end provides a level output within conductor 114. Conductor 114 connects to one of the input points of the timing and control circuit 66. Associated with comparator 184 is a resistor 186 and a capacitor 188 to provide hysteresis in a positive feedback loop 190 of the comparator 184. This feedback loop 190 is to negate any noise not removed by the filter amplifier 74 to eliminate any false triggering of the time determining circuit.

The received signal within conductor 192 from relay 82 is processed in exactly the same way that the signal within conductor 72 is processed. Therefore, identical numerals with a prime sign have been utilized to refer to similar parts and for a discussion as to transmitting of the signal from conductor 192 into conductor 116, reference is to be had to the discussion applicable to those numerals.

The relays 80 and 82 are operationally connected together as denoted by line 194. The relay 82 is basically an analog switch which selects the signal from the appropriate receiving transducer 32 and couples the signal through conductor 192 into the inverting input of the operational amplifier 168'. This analog switch 82 is connected to the computer 58 through IC6 of the peripheral controlling circuit 64 with this connection occurring by conductor 196. It is through the conductor 196 that the computer selects the appropriate transmit/receive transducer pair by way of software. Computer control of the relay 82 is provided by IC6 (see FIG. 11). A desirable device for IC6 would be an Intel Corporation 8255 programmable peripheral interface which has previously been mentioned. IC6 provides address and control translation from the address of the computer 58 and control busses to the peripheral controlling circuit 64.

Referring in particular to FIG. 4, the conductor 196 is actually shown as three separate conducting lines between the peripheral controlling circuit 64 and the relay 80. It is to be understood that in actual practice the conducting lines 196 will also be directly connected to relay 82 as is shown within FIG. 11.

Figure 10:
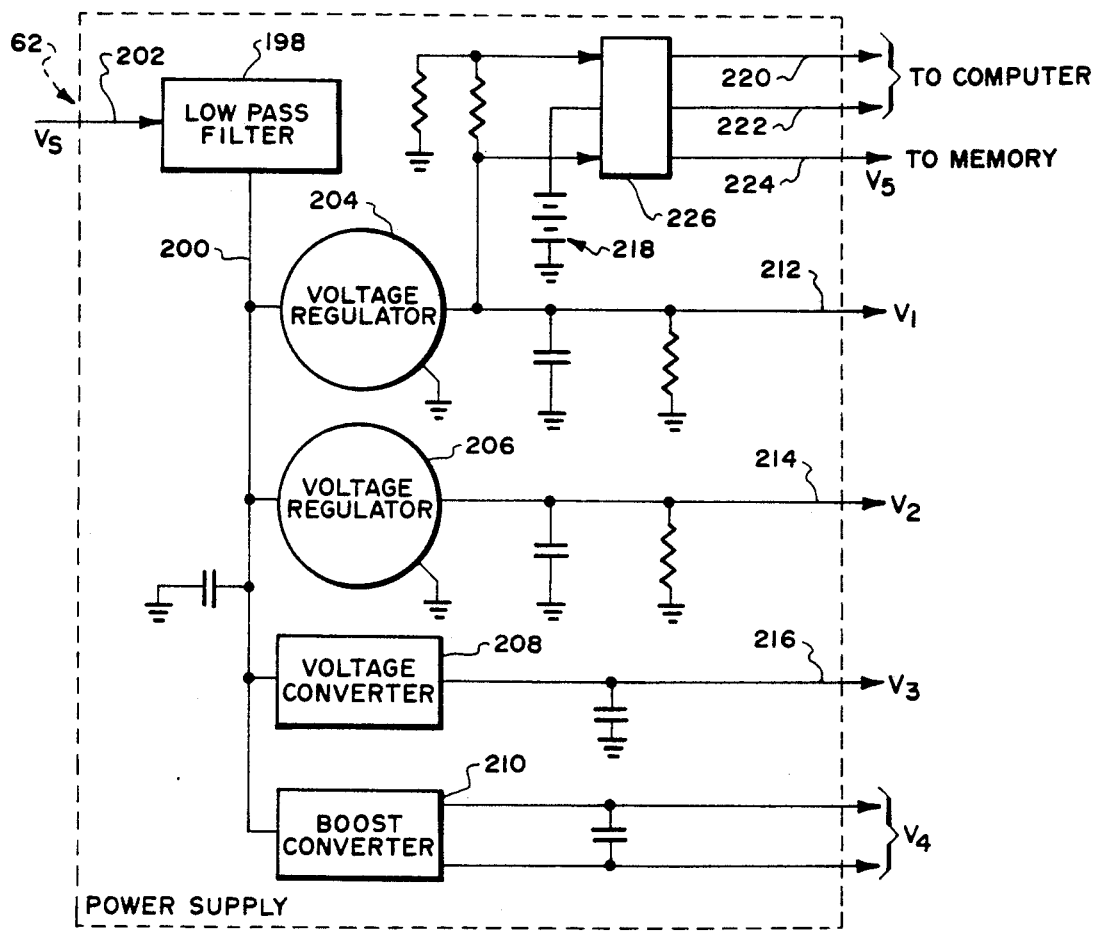
FIG. 10 is an electronic schematic view of the power supply shown in block form in FIG. 4.
Figure 11:
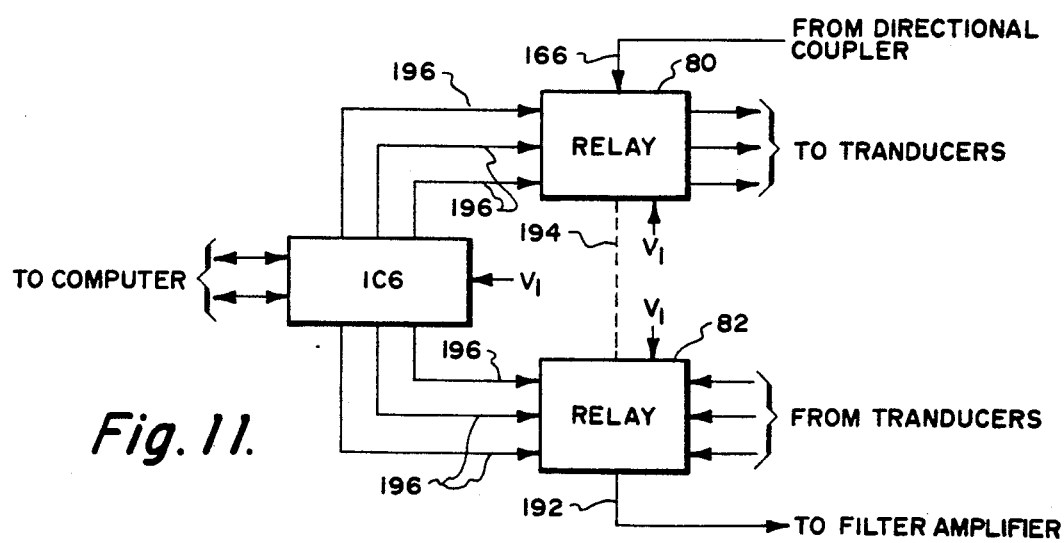
FIG. 11 is an electronic schematic of a peripheral controller and relay combination.

The circuit for the power supply 62 is shown in FIG. 10. This power supply circuitry provides five different filtered and regulated voltages for the entire apparatus of this invention. There is also a power supply monitor circuit with battery backup to protect the computer 58 and its memory circuitry from low voltage conditions (less than plus two volts).

A source voltage Vs is to be supplied into a low pass filter 198. The low pass filter 198 is designed for DC current only. The output of the low pass filter 198 is conducted into line 200. This low pass filter is a commercially available unit whose function is to suppress noise which is present on the power supply input line 202.

The output line 200 from the low pass filter 198 is connected to a first voltage regulator 204, a second voltage regulator 206, a voltage converter 208 and a boost converter 210. The voltage regulators 204 and 206 are conventionally purchasable products from National Semiconductor, Inc., Model No. LM340. Voltage regulator 204 produces an output within conductor 212 with this output being $V_1$. Voltage regulator 206 produces an output within conductor 214 which is $V_2$. Typical voltage for $V_1$ would be plus 5.0 volts. Typical voltage for $V_2$ would be +10.0 volts.

The voltage converter 208 is provided to convert the positive supply voltage within conductor 200 to a regulated negative voltage. Voltage converters are deemed to be conventional and produce a voltage $V_3$ within its output line 216. Typical voltage for $V_3$ would be a −10.0 volts.

The boost converter 210 is again a conventionally purchasable product such as part E-SOO, manufactured by Endicott Research Group of Endicott, N.Y. It is the function of the boost converter 210 to provide an increase in the DC voltage from line 200. Typical voltage output of the boost converter is $V_4$ which is plus or minus one hundred volts.

The primary driving voltage throughout the apparatus of the present invention is $V_1$. This voltage $V_1$ is transmitted to both the computer 58 and the memory 60 as well as many of the other components of the apparatus of this invention. However, within the computer 58 and the memory 60 are preprogrammed memory chips. If for any reason there is a loss of voltage to computer 58 and memory 60, or a decrease of the voltage below a certain level, then the preprogrammed memory within computer 58 and memory 60 would be lost. To avoid this, it is desirable to use a battery backup circuit which monitors the output of voltage regulator 204 within line 212 and if the voltage within line 212 is lost, even momentarily, the battery 218 is utilized to maintain a continuous voltage through lines 220 and 222 to the computer 58 and in line 224 to memory 60. The voltage transmitted to memory 224 is referenced as $V_5$ with this voltage being 3.0 volts.

Included within the battery backup circuit is a watch dog unit 226. This watch dog unit 226 is again a purchasable product such as Model MAX 690, manufactured by Maxim Corporation of Sunnyvale, Calif. This watch dog unit 226 is to detect any power failure. The unit 226 then begins a shutdown routine by transmitting a signal through the interrupt line 220. During this period of time, voltage $V_1$ is sustained.

If voltage $V_1$ begins to fall, but is still above the watch dog unit's 226 minimum operating voltage, the watch dog unit 226 switches to the reset mode through line 222. In this position, the memory within the computer 58 is still protected. If voltage $V_1$ falls further, complete switching to the battery voltage 218 occurs it is to be noted that during this entire time a minimum voltage of three volts, $V_5$ is transmitted to the memory 60 preventing loss of the memory 60.

If for any reason the voltage of battery 218 begins to fall, the unit 226 is capable of switching to a further low powered condition at some further diminished voltage level. This minimum voltage level will be transmitted to the computer 58 as well as to the memory 60. If for any reason the voltage within battery 218 is lost, then the memory in both the computer 58 and the memory 60 will be lost. However, it is believed that this situation would be very unusual.

It is to be noted that comparing the detailed description of this invention to the attached drawings, there are included resistors, capacitors, and semi-conducting devices, which have not been specifically called out. Inclusion of these components are for biasing, timing and other exceedingly conventional normal functions of any electronic circuit. Therefore, it is believed to not be necessary to specifically describe these components and their functions.

Figure 12:
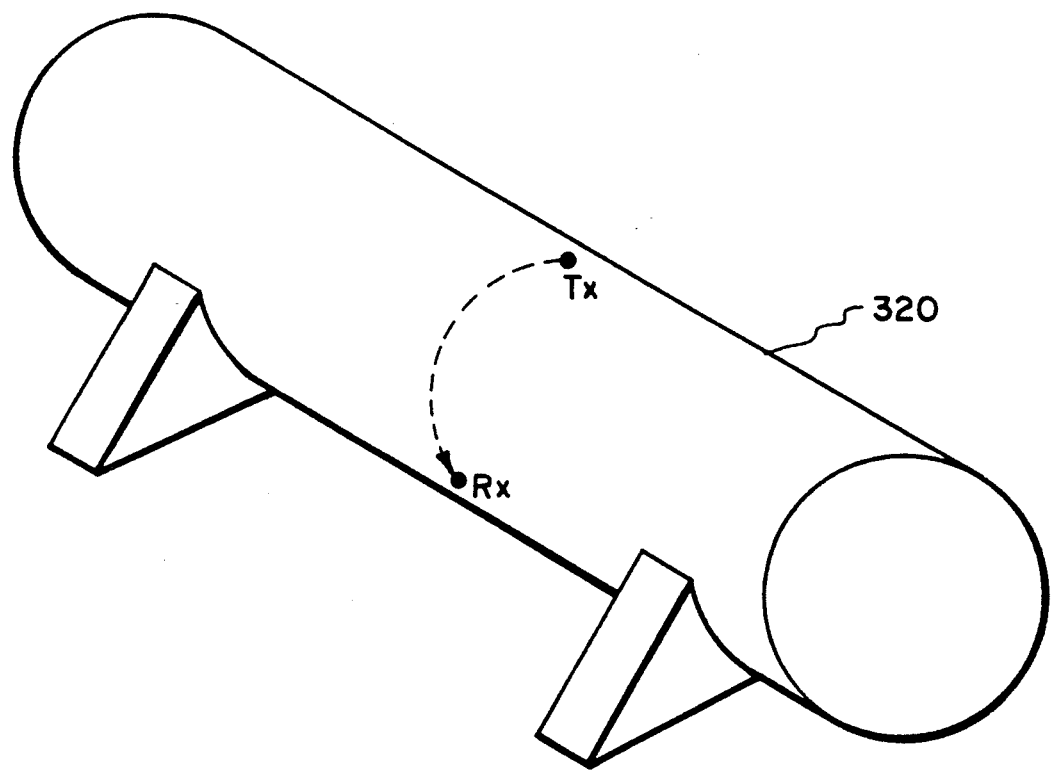
FIGS. 12 and 13 illustrate the present invention applied to pressure vessels.
Figure 13:
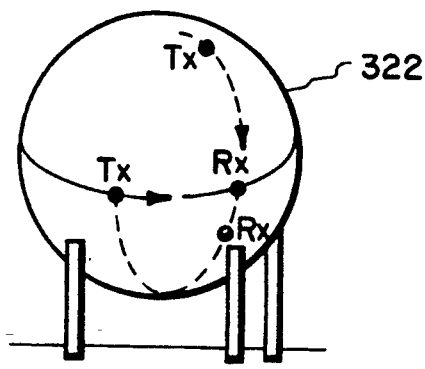

The present invention may be used in other applications aside from truck axles. For example, FIGS. 12 and 13 depict a cylindrical pressure vessel 320 and a spherical pressure vessel 322, respectively. Inside the pressure vessel (either 320 or 322) is a liquid or gaseous fluid substances. Here, the present invention has utility in instances when it may not be appropriate to use conventional transducers due to environmental or physical constraints.

As shown in FIGS. 12 and 13, the transmitting transducer, labelled Tx, is attached directly to the vessel wall. Located a predetermined distance away is a receiving transducer Rx. As seen in FIG. 13, more than one pair of transducers may be used at a time with the redundancy improving accuracy of the readings. Of course the transmitting and receiving transducers Tx and Rx may be arranged linearly or orthogonally, as illustrated, or in any other manner known in the art depending on vessel geometry and size.

In order to calibrate these transducers, the same techniques applied to truck axles apply here to pressure vessels as well. Where once load or force acting on a truck axle is measured, internal pressure is now the objective. Here, as fluid enters or drains from the tank 320 or 322 or other ambient conditions change, pressure on the walls varies accordingly. Since pressure is defined as force directed over an area, one can conceptualize a resultant force generated by the fluid contents of the pressure vessel acting over an area of the vessel wall.

Hence, the hypothetical resultant force acting on the vessel wall between a transmitting transducer Tx and a receiving transducer Rx can be measured according to the present invention by interpolating detected changes in elapsed time received from the transducers Tx and Rx. To do so only requires that the effective area on which the resultant force acts be estimated, and that the magnitude of the resultant force be divided by the area to obtain pressure.

It should be clear by now that calibration of this pressure determining embodiment of the present invention and its operation are pretty much the same as with the truck axle embodiment discussed above. Several reference points based on known wall pressures are required in order for the microcomputer 58 to establish an elapsed time versus pressure correlation. Next, the microcomputer 58 stores and establishes a best fit curve for the correlation. Thereafter, any unknown pressure can be interpolated using the correlation from elapsed time data.

It is important to note here that while the forces acting upon the pressure vessel versus the changes in pressure are essentially linear, that is not a necessity for accurate operation of the present invention. Just enough data points are required to provide an accurate mathematical representation of the vessel's behavior at different pressure levels.

Moreover, when the present invention is used to measure pressure in a tank or vessel, it is possible to convert those pressure readings into an estimation of fluid level. Obviously, as a tank is filled with fluid, the pressure on the walls increases. Those pressure increases are stored in the memory of the present invention and correlated to the fluid level corresponding to the increased pressure. After the initial set-up procedure described above and which includes taking into account ambient pressure and temperature, the present invention can then estimate fluid level in the tank as a function of wall pressure.

Another application, which although not unique but through the use of acoustic wave behavior in solids becomes a far more pragmatic implementation of the present invention, involves locating the center of gravity of an aircraft. It is important that an aircraft's center of gravity be maintained within close proximity to its center of lift to ensure aerodynamic stability. Given the present invention's ability to measure the magnitude and position of any load acting on the aircraft's fuselage as already demonstrated on truck axles, it is possible to apply the same to an aircraft. In this role, the present invention is used to optimize the lifting performance of the aircraft, which results in a pilot not having to rely on excessive use of surface controls, which increases drag and hence detracts from fuel efficiency of the aircraft.

Figure 14:
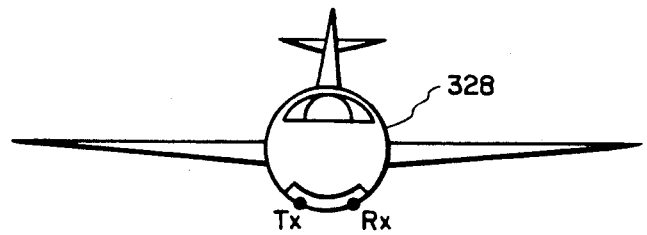
FIG. 14 is a front view of an airplane employing the present invention.
Figure 15A:
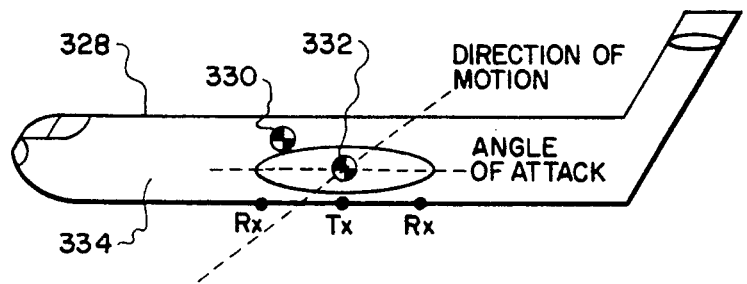
FIG. 15(a) is a side view of the airplane shown in FIG. 14.

FIGS. 14 and 15(a) illustrate front and side views of an aircraft 328, showing possible mounting positions of transmitting transducers Tx and receiving transducers Rx. Although oversimplified, an aerodynamic principle suggests placing the center of gravity 320 (the point through which the line of action of the weight passes) several degrees behind the center of lift 322. So when the aircraft 328 flies at cruising speed, the angle of attack formed by its wings versus its direction of motion provides maximum lift. Little or no wing trim is necessary thus minimizing drag, as explained above.

Although the foregoing concept is in existence and is currently in use, conventional technology depends on strain gages. Calculation or measurement of the aircraft's center of gravity 330 is a complex task and cannot easily be determined with the aircraft 328 resting on its landing gear (not shown).

Fortunately, gross aircraft weight can be measured using concepts taught by the present invention as explained above in connection with measuring the load on a truck axle. Indeed, the transmitting and receiving transducers Tx and Rx may be incorporated into the landing gear of the aircraft 328, and just like a truck axle, the load acting thereon can be determined by the present invention. The load on each landing gear strut can then be determined. Once this has been done, the aircraft's center of gravity 330 can be found through procedures known in the art.

Figure 15B:
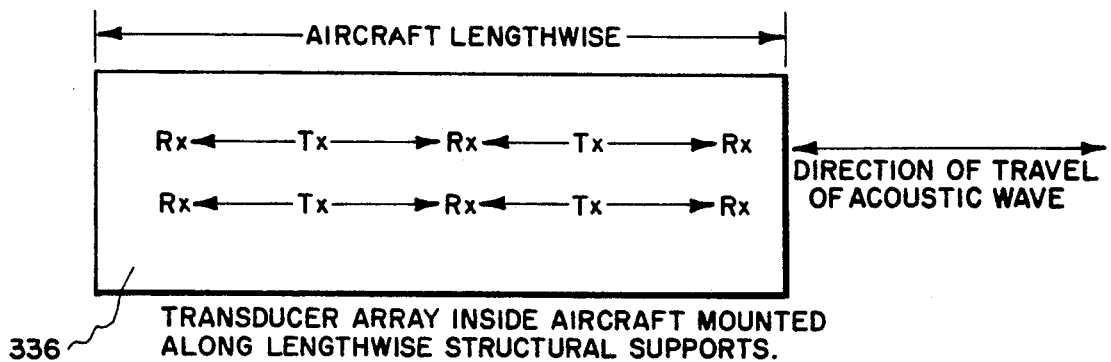
FIG. 15(b) is a magnified view of a transducer array provided by the present invention.

Once the center of gravity 330 has been determined, a transducer array 336 as depicted in FIG. 15(b) installed about the unloaded center of gravity 330 can precisely measure the shifting weights in the aircraft's fuselage 334 by again measuring the changes in the elapsed time and using this acquired data as described in connection with the truck axle embodiment above to determine the resulting loads. Although weight is being shifted about the aircraft, it is not the main issue here; rather, the distribution of weight and the center of lift are the primary concerns.

Furthermore, by arraying the transducers as shown in FIG. 15(b), it is possible to achieve optimal center of lift characteristics by carefully placing loads in the aircraft. The process entails measuring the stresses acting on the fuselage 334 through use of the present invention, then comparing the dimensionless load values as they are shifted about some arbitrarily defined fulcrum in the transducer array 336. The array fulcrum is best placed nearest the true unloaded center of gravity in order to minimize adding large offsets to the array 336 in order to make it appear balanced with the benefit of decreasing computational errors.

Another approach to be considered is the use of the landing gear mounted load system (i.e., nose wheel and fuselage-mounted landing gear near wing centers). In the simplest terms, for the center mounted landing gear, the center of gravity would be centered exactly over the wheels when the sum of the weights measured in the front wheels equals the sum of the weights on the center mounted wheels divided by two. Manipulation of the aircraft center of gravity can be accomplished by monitoring the wheel loading by the same mathematical techniques one would use to calculate the center of gravity of a loaded beam or truck axle. In this sense, this embodiment of the present invention is similar to the truck axle embodiment except for the addition of software algorithms utilizing air vehicle length and the placement of the wheels (fulcrums).

Figure 16:
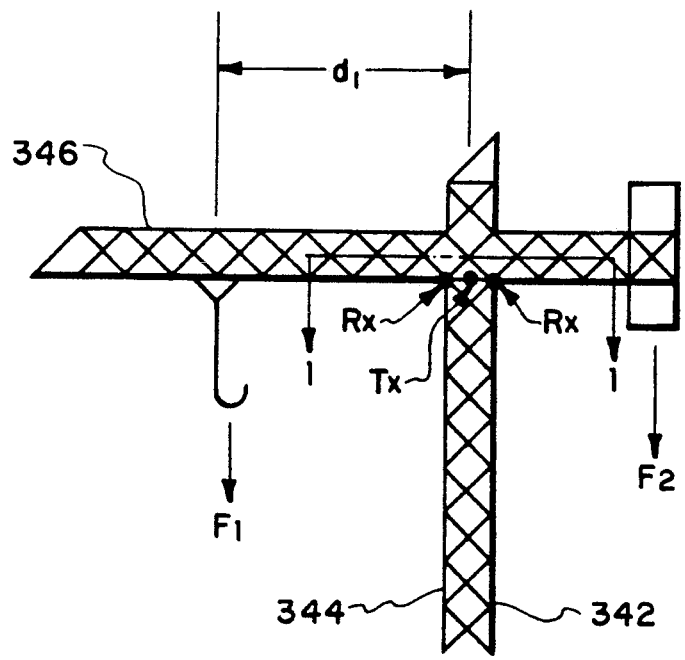
FIG. 16 illustrates a crane employing the present invention.
Figure 17:
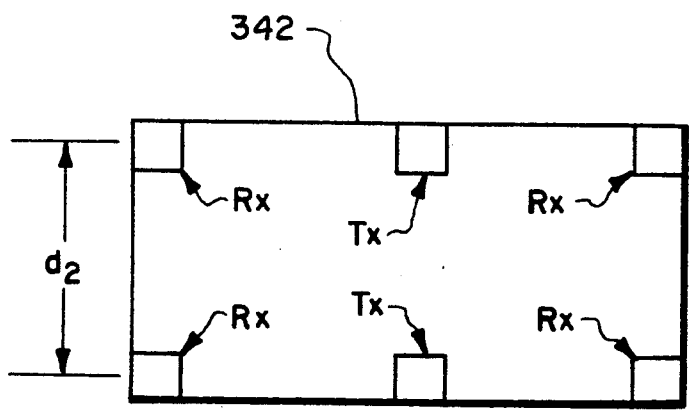
FIG. 17 is a cross-sectional view of the crane taken along line 1—1 of FIG. 16.

FIGS. 16 and 17 illustrate a crane 342. The present invention may be installed in the crane 342 to monitor loading $F_1$ and possible imbalances to ensure safety. If the load $F_1$ to be lifted exceeds the crane's operational center of gravity, the crane 342 may topple over causing serious injury and damage to property. Furthermore, the bending moment caused by the load $F_1$ acting over a bending arm $d_1$ tends to bend the vertical member 344 as well as horizontal member 346. Counterweight $F_2$ helps balance out the load $F_1$, but additional safety mechanisms are preferable.

Fortunately, the load $F_1$ pulling down on the crane 342 can be monitored according to the present invention in the manner depicted in FIG. 16. As shown, acoustic transducers Tx and Rx are affixed to the crane 342 to detect bending moments in either the vertical 344 or horizontal member 346 of the crane 342. FIG. 17 is a cross-sectional view taken along line 1—1 of the crane 342 shown in FIG. 16. If the transducers Tx and Rx are so arranged, it is possible to determine bending moments since at any instant, oppositely disposed transducers are in compression and tension. The bending moment is easily calculated by multiplying the force measured by a pair of adjacent transducers Tx and Rx by the bending arm $d_2$, which in this case is the distance between the transducers.

Once more the active loads within the members 344 and 346 can be determined through use of the techniques taught in connection with the truck axle embodiment mentioned above. Moreover, after the transducers Tx and Rx and associated electronics are installed on the crane 342, reference or calibration measurements are taken indicating the level of structural pre-stress since the crane 342 must support a counterweight $F_2$ without even lifting any load. This step is necessary not only to ascertain the level of structural pre-stress, but also to account for the material texture thus allowing for precise measurement of any change in structural loading.

Figure 20:
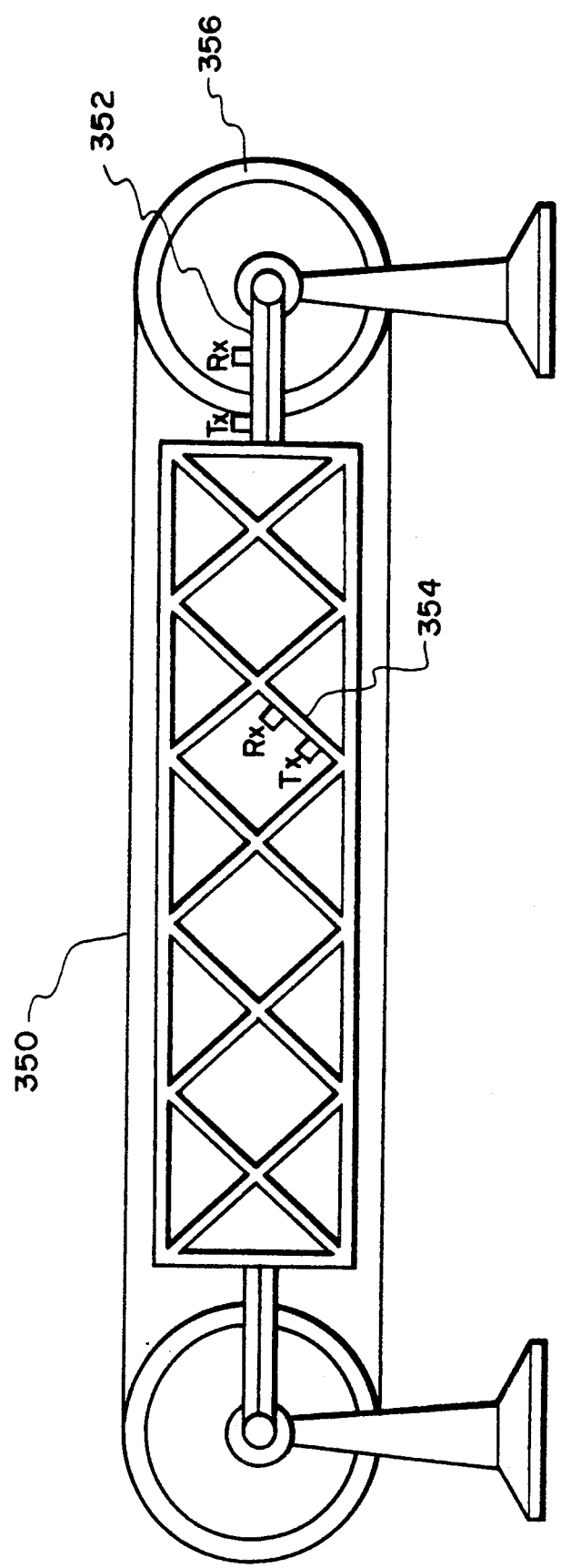
FIG. 20 is a side view of a conveyor belt upon which are mounted transducers provided by the present invention.

In yet another application, the present invention can be mounted to the frame of a conventional conveyor belt 350 as shown in FIG. 20. As depicted in a side view, drive wheels 356 on the conveyor belt 350 maintain tension in the belt by stretching it in opposite directions. Of course a reaction force tends to push back against the drive wheels 356 and, in turn, acts on the frame 352 or cross members 354 of the frame 352. If transducers Tx and Rx are mounted to the frame 352 as shown here, it is possible to estimate the tension in the belt indirectly by measuring the loads acting on the frame 352. FIG. 20 provides a few examples of how the transducers Tx and Rx may be mounted to the frame 352 or cross members 354. Other mounting configurations are, of course, possible.

Through the same calibrating procedure as discussed before, reference tensions are established and correlated to their respective elapsed times as measured by Tx and Rx. Once that is accomplished, and when the conveyor belt 350 is up and running, changes in elapsed times of sound waves passing through the frame 352 can be quickly converted into estimates of the belt tension, wherein belt tension in this embodiment is a quantity of force. Furthermore, the belt tension data can be collected and used for a variety of preventative maintenance purposes well known in the art.

In another aspect of the present invention, only one transducer is used to propagate and receive the sound wave. In the conveyor belt embodiment, for example, only transducer Tx is needed; transducer Rx is removed. A sound wave is propagated from Tx. The sound wave passes down the frame 352 eventually encountering a reflecting surface such as the hub of the drive wheel 356. The sound wave is then reflected back toward transducer Tx, at which point the time elapsed from transmission to detection after reflection is stored. This measured elapsed time is then used to calculate tension or other loads. Thus, the acoustic distance that formerly was defined by the spacing between transducers is now defined as the distance the sound wave travels to a reflecting surface and back.

What is claimed is:

1. An apparatus for measuring a quantity of force, moment, torque or pressure acting on a load-bearing member of a structure comprising:
   a transmitting transducer for transmitting an acoustic wave through said load-bearing member, said transmitting transducer being responsive to a first control signal and being affixed to said load-bearing member;
   a receiving transducer outputting a second control signal that is responsive to the acoustic wave after the acoustic wave traverses a known distance from said transmitting transducer, said receiving transducer being affixed to said load-bearing member, said receiving transducer being spaced from said transmitting transducer;
   means for timing and control and for sending said first control signal to said transmitting transducer and for measuring an elapsed time until detection of said second control signal outputted from said receiving transducer, and outputting the measured elapsed time; and
   means for converting the measured elapsed time outputted from said means for timing and control into an estimation of the quantity of force, moment, torque or pressure by interpolating from an correlation previously established between known quantities of force, moment, torque or pressure and their respective measured elapsed time.

2. An apparatus for measuring according to claim 1, wherein the apparatus has more receiving transducers than transmitting transducers.

3. An apparatus for measuring according to claim 2, wherein only a single transmitting transducer and a simple receiving transducer are activated at any instant.

4. An apparatus for measuring a quantity of force, moment, torque or pressure acting on a load-bearing member of a structure comprising:
   transducer means for emitting an acoustic wave through the load-bearing member and for detecting a reflection of the acoustic wave after said acoustic wave has traversed an acoustic distance, said transducer means being fixedly mounted on said load-bearing member;
   means for timing and control for activating said transducer means to emit said acoustic wave and for measuring an elapsed time until detection of said acoustic wave by the transducer mans, and outputting the measured elapsed time; and
   means for converting the measured elapsed time outputted from said means for timing and control into an estimation of the quantity of force, moment, torque or pressure by interpolating from an correlation previously established between known quantities of force, moment, torque or pressure and their respective measured elapsed time.

* * * * *